Kenichi Ito
INVENTOR.
BY George B. Oujevolk
Attorney

Kenichi Ito
INVENTOR.
BY George B. Oujevolk
Attorney

Kenichi Ito
INVENTOR.

BY George B. Oujevolk
Attorney

Kenichi Ito
INVENTOR.

BY George B. Oujevolk
Attorney

United States Patent Office 3,427,543

Patented Feb. 11, 1969

3,427,543

TELEVISION FM SOUND BROADCASTING WITH HIGH FREQUENCY DEVIATION IN ST LINK

Kenichi Ito, Yokohama-shi, Japan, assignor to Tokyo Shibaura Electric Co., Ltd., Kawasaki-shi, Japan, a corporation of Japan Filed May 28, 1965, Ser. No. 459,841
Claims priority, application Japan, May 29, 1964, 39/30,042
U.S. Cl. 325—7 3 Claims
Int. Cl. H04n 7/04

ABSTRACT OF THE DISCLOSURE

A television sound broadcasting system including a studio and a broadcasting station interconnected by an ST link. In the studio there are provided a subcarrier wave oscillator, an FM modulator adapted to frequency shift output signals from said oscillator by means of a source of sound signals to an extent exceeding a prescribed maximum frequency shift of finally transmitted electric waves, a combiner to mix the output signals from said modulator and video signals produced in said studio, a transmitter modulated by the combined signal from said combiner and means to transmit the output signals from said transmitter to said broadcasting station. The broadcasting station is provided with a receiver adapted to receive and demodulate signals transmitted from said studio over an ST link, a separator adapted to separate said combined signals demodulated by said receiver into said video signals and said frequency modulated subcarrier wave signals, a video transmitter modulated by said video signals separated by said separator, a frequency divider to step down the frequency of said subcarrier wave separated by said separator to an extent to provide the maximum frequency shift desired for the broadcasted electric waves, means to mix the output signals from said frequency divider with the output signals from said video transmitter and means to radiate in the air said mixed signals as the television broadcasting electric wave.

This invention relates to a broadcasting system of television sound signals and more particularly to a television sound broadcasting system so arranged that television sound signals transmitted from a studio are broadcasted as they are received, without being modulated or by merely changing frequency in a broadcasting station.

In one form of a conventional television sound broadcasting system sound signals generated in a studio are supplied to a modulator to be frequency modulated by a subcarrier wave having a frequency higher than the video signal band generated by a subcarrier wave oscillator. The modulated signals are then mixed with a video signal generated in the studio to provide combined signals which are utilized to further modulate a television repeater transmitter. The output of this transmitter is then radiated in the air towards a broadcasting station. In the broadcasting station, signals received by a receiver are supplied to a separator to produce independent video signals and subcarrier waves, the former being utilized to modulate video transmitter connected to a diplexer. On the other hand the separated subcarrier waves are supplied to a subcarrier wave demodulator to produce sound signals which are then frequency modulated by an FM modulator, the output thereof being supplied to said diplexer to be radiated in the air through an antenna as the television broadcasting wave.

While such a broadcasting system is generally satisfactory it is disadvantageous for systems requiring superior characteristics such as stereo broadcasting.

It is therefore the general object of this invention to provide a novel television sound broadcasting system.

Briefly stated, above object and other objects of this invention can be attained by providing a television sound broadcasting system including a studio and a broadcasting station interconnected by an ST link. In the studio there are provided a subcarrier wave oscillator, an FM modulator adapted to frequency shift output signals from said oscillator by means of a source of sound signals to an extent exceeding a prescribed maximum frequency shift of finally transmitted electric waves, a combiner to mix the output signals from said modulator and video signals produced in said studio, a transmitter modulated by the combined signal from said combiner and means to transmit the output signals from said transmitter to said broadcasting station. Whereas the broadcasting station is provided with a receiver adapted to receive and demodulate signals transmitted from said studio over an ST link, a separator adapted to separate said combined signals demodulated by said receiver into said video signals and said frequency modulated subcarrier wave signals, a video transmitter modulated by said video signals separated by said separator, a frequency divider to step down the frequency of said subcarrier wave separated by said separator to an extent to provide the maximum frequency shift desired for the broadcasted electric waves, means to mix the output signals from said frequency divider with the output signals from said video transmitter and means to radiate in the air said mixed signals as the television broadcasting electric wave.

While the specification concludes with claims particularly pointing out and distinctly claiming the subject matter which I regard as my invention, it is believed that the invention will be better understood from the following description taken in connection with the accompanying drawings, in which:

Figure 1:
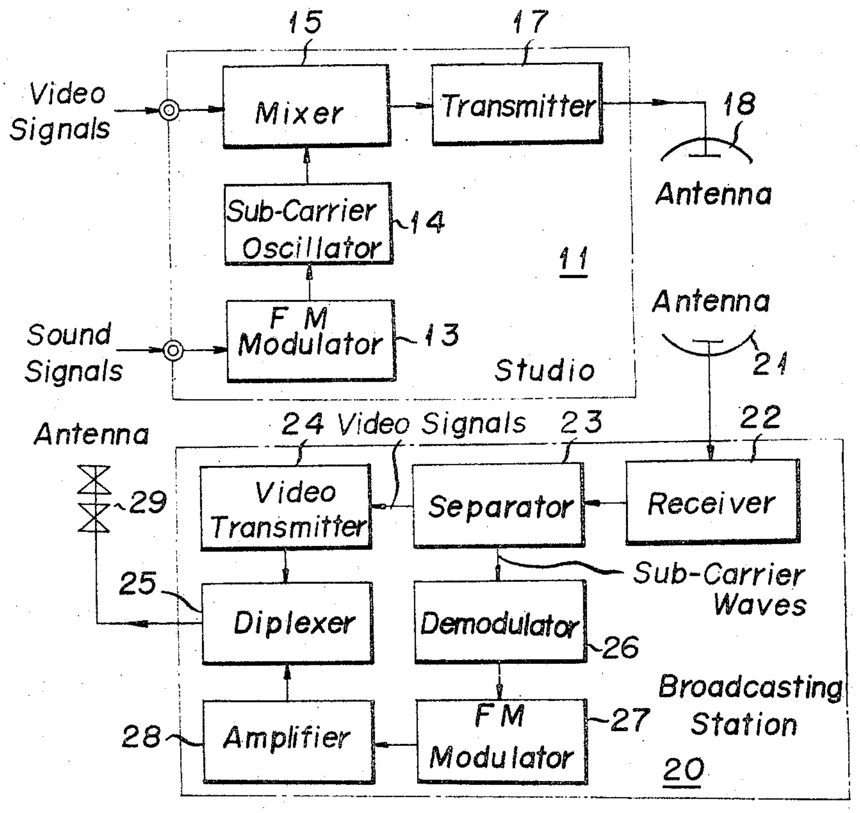
FIG. 1 is a schematic diagram to explain one form of a conventional television sound broadcasting system.

Before describing the invention in detail a construction of a conventional television sound broadcasting system and problems involved therein will first be described by referring to FIG. 1. In such a system sound signals 12 which are generated in a studio are supplied to a modulator 13 to be frequency modulated therein by a subcarrier wave which has a frequency higher than the video signal band and is generated by a subcarrier wave oscillator 14. The modulated signals are then mixed with a video signal 16 generated in the studio to provide combined signals which are utilized to further modulate a television repeater transmitter 17. The modulated waves are sent from a transmitting antenna 18 to a broadcasting station 20. In the broadcasting station 20 the modulated signals transmitted from the studio 11 are received by a receiving antenna 21 and are then supplied to a television repeater receiver 22. The combined signals demodulated by said receiver 22 are supplied to a video signal subcarrier wave separator 23 to produce independent video signals and subcarrier wave, the former being utilized to modulate a video transmitter 24 connected to a diplexer 25. Whereas the subcarrier wave separated by the separator 23 is transmitted to a subcarrier wave demodulator 26 to produce sound signals which are then frequency modulated by an FM modulator 27. The frequency modulated sound signals are supplied to said diplexer 25 after being amplified by a suitable amplifier 28. The respective signals supplied to the diplexer 25 are combined to be radiated in air as the actual television broadcasting waves via an antenna 29.

The above described broadcasting system is generally satisfactory, but there are difficulties as will be pointed out below in broadcasting systems requiring superior characteristics as for example stereo broadcasting systems. More specifically, as the signals undergone a frequency modulation process in the broadcasting station are once detected and then frequency modulated again the modulation frequency characteristic, percentage of distortion and degree of separation and the like of the sound signals are degraded. Moreover in such a system it is required to add supervisory means which functions to constantly supervise the modulation characteristic of the broadcasting apparatus as well as the input signal level which results in the complication of the apparatus and increase in the chance of fault.

It is therefore the principal object of this invention to provide a novel television sound broadcasting system which enables utilization of ST links in broadcasting systems required to have superior characteristics, for example stereo broadcasting systems and multiplex broadcasting systems wherein more than two different languages are broadcasted simultaneously for the same picture.

Figure 2:
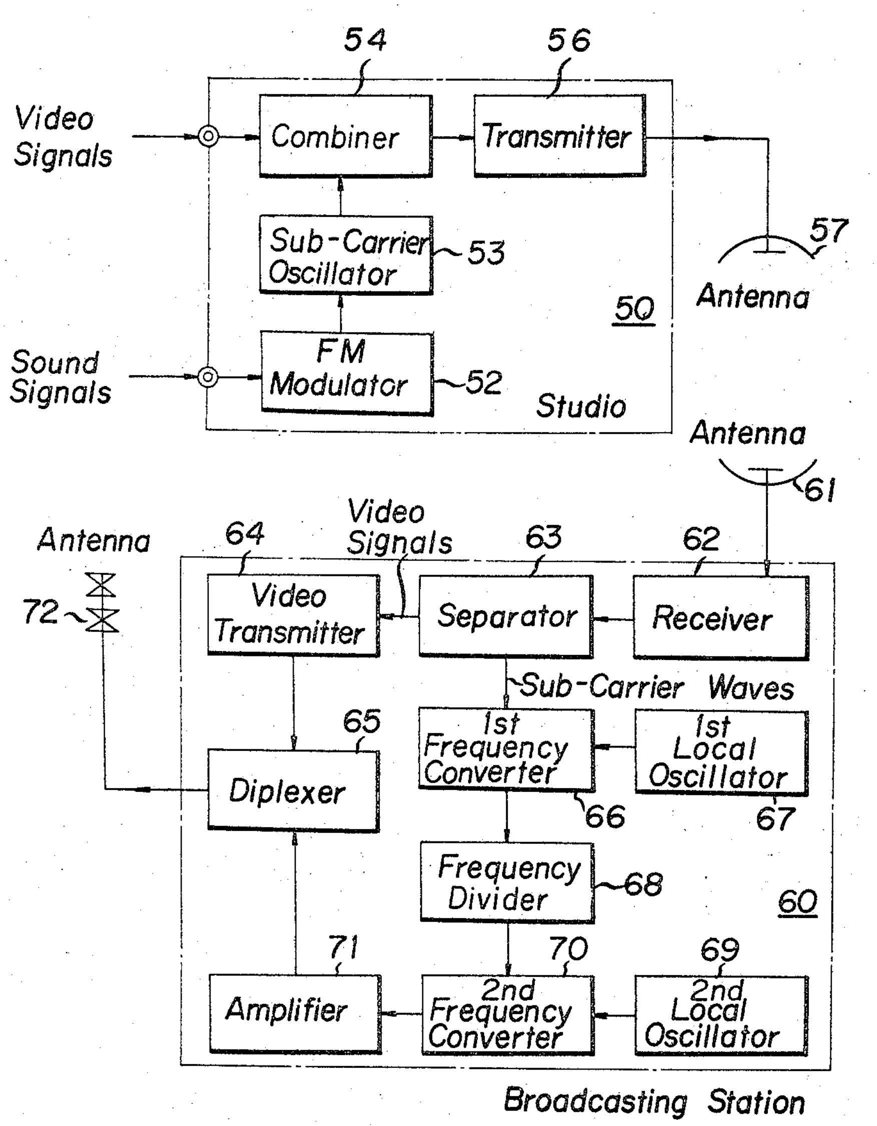
FIG. 2 is a block diagram of one example of a television sound broadcasting system embodying this invention.

Referring now to FIG. 2 of the accompanying drawing which illustrates one embodiment of this invention, there is shown a studio 50 wherein sound signals 51 generated therein are supplied to a modulator 52 to frequency modulate a subcarrier wave signal generated in a subcarrier wave oscillator 53. In this case it is to be understood that the signal is modulated to such an extent that the frequency shift (or degree of modulation) of the frequency modulator 52 is larger than the predetermined maximum frequency shift of finally transmitted electric wave but less than the maximum frequency shift determined by the carrier wave utilized in ST links. It is the practice in Japan to provide a frequency shift of 50 kc. in ST links of 7000 mc. band. Signals which are frequency modulated by said frequency modulator 52 are directly, or after being subjected to frequency conversion, if desired, supplied to a video signal subcarrier wave mixer 54 to be mixed therein with video signals generated in the studio. The combined signals comprising the sound signals and video signals function to modulate a television repeater transmitter 56. The outputs from the transmitter 56 are suitably amplified and then radiated as electric waves through a transmitting antenna 57 towards the broadcasting station 60. In the broadcasting station electric waves from the studio 50 are received by a receiving antenna 61 and then demodulated by a television repeater receiver 62. The demodulated combined signals are then separated into the video signals and the subcarrier wave by the action of a video signal subcarrier wave separator 63, the video signals being utilized to modulate again a video broadcasting apparatus. The outputs therefrom are supplied to a diplexer 65 after amplification.

On the other hand the separated subcarrier wave signals are supplied to a first frequency converter 66 wherein their frequency is converted by being mixed with the output from a first local oscillator 67. The frequency converted signals are then supplied to a frequency divider 68 to decrease the frequency shift of the sound signals down to the frequency shift of electromagnetic waves suitable for television sound broadcasting. When desired a second local oscillator 69 and a second frequency converter 70 are provided to convert the frequency of the signals to a frequency desired for the final purpose and the frequency converted signals are applied to said diplexer 65 through a power amplifier 71 in which they are mixed with the outputs from the video broadcasting apparatus 64 and are then radiated in the air as the broadcasting waves through an antenna 72.

Where said first local oscillator 67, frequency converter 66 and frequency divider 68 are constructed to convert signals into the desired broadcasting frequency the provision of the second local oscillator 69 and the frequency converter 70 is unnecessary.

Figure 3:
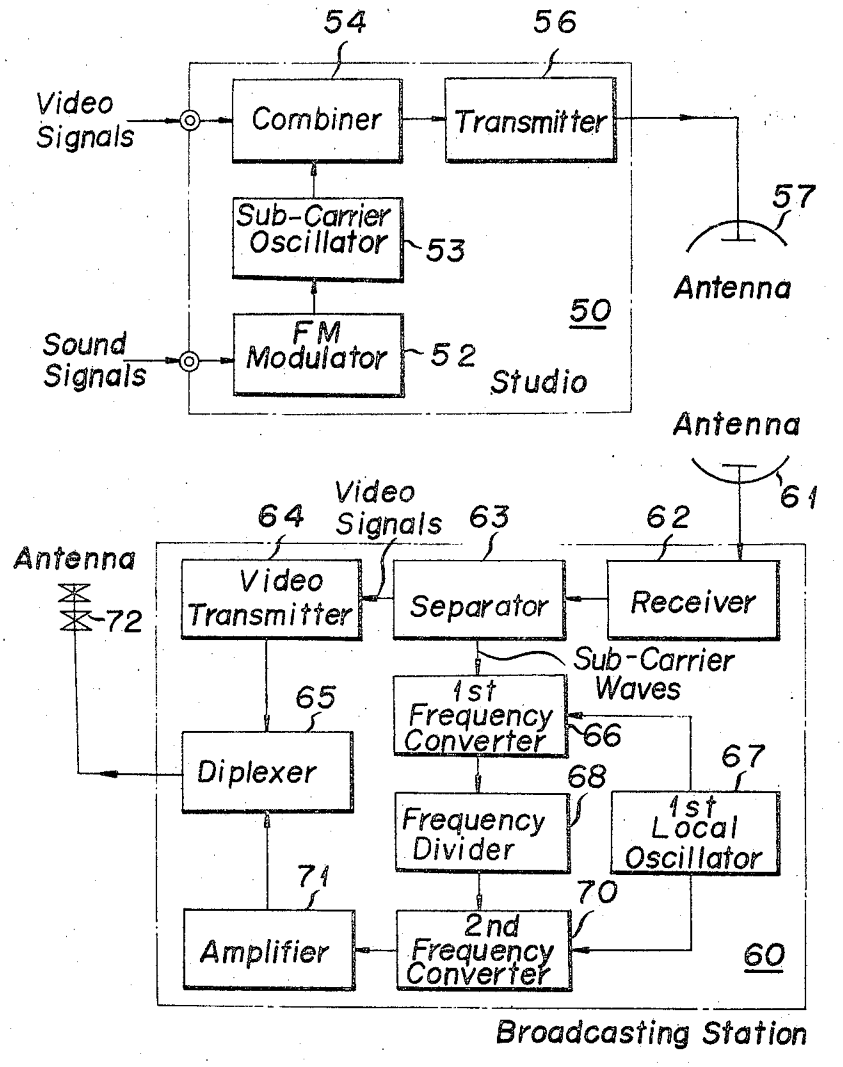
FIGS. 3 and 4 are block diagrams representing modified embodiments of this invention.

FIG. 3 illustrates a modification of this invention wherein a single local oscillator 67 is used to feed both the first and second frequency converters 66 and 70 located in a broadcasting station. This modification operates in the same manner as the first embodiment.

Figure 4:
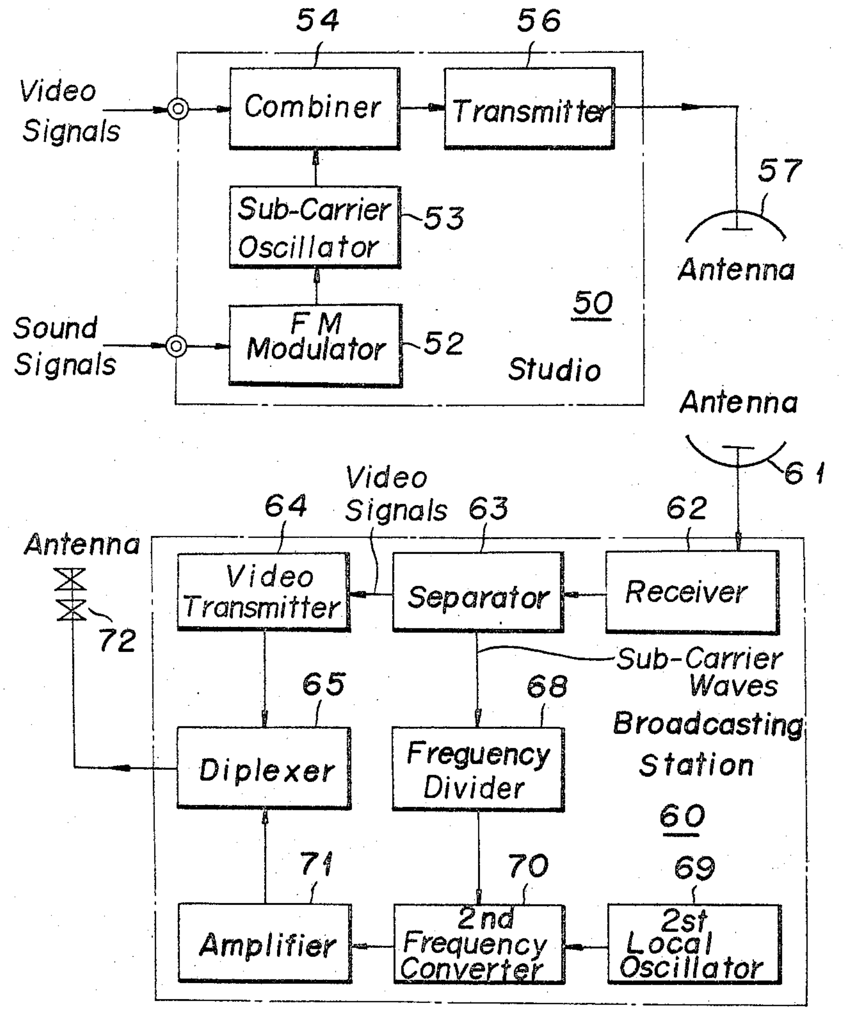

FIG. 4 shows still another embodiment of this invention wherein the first frequency converter 66 and the first local oscillator shown in FIG. 2 are eliminated whereby the frequency of the frequency modulated subcarrier wave signals are directly stepped down by the action of a frequency divider 68 to provide the maximum frequency shift desired for broadcasting electric waves. The output signals from the frequency signals are then applied to a second frequency converter 70 to be mixed therein with the output from a second local oscillator 69 to obtain a frequency desired for broadcasting electric waves. The outputs from the second frequency converter 70 are supplied to a diplexer 65 through a power amplifier 71 and thence to an antenna 72.

While in the above illustrated embodiments the frequencies were shifted to an extent more than the prescribed maximum frequency shift of finally transmitted wave by the action of the modulator 52 included in the studio 50 it should be understood that this invention is by no means limited to these particular arrangements. For example the modulator 52 may be operated to provide a suitable frequency shift less than the prescribed maximum frequency shift and then the frequency may be multiplied by a frequency multiplier to an extent exceeding the prescribed maximum frequency shift and then mixed with the video signals. Alternatively after multiplying their frequency by said multiplier, the frequency of the signals may be converted to a value suitable to be mixed with video signals.

Referring again to FIG. 2, the following numerical data is given as an example. Where the oscillation frequency of the subcarrier oscillator 53 is equal to 6.8 mc., the frequency shift or degree of modulation thereof to 50 kc., sound carrier frequency of television broadcasting to 95.75 mc., the prescribed maximum frequency shift to 25 kc., the oscillation frequency of the first local oscillator 67 to 24.7 mc., and if it is assumed that a sum of frequencies are to be derived out as the output of the first frequency converter 66 then the frequency of said output could be represented to 24.7 mc.+6.8=31.5 mc. If it is assumed that the requency of the frequency converter 66 is to be reduced to one half by the action of the frequency divider 86, it would provide an output of 31.5 mc.÷2=15.75 mc. Concurrently therewith the degree of modulation is also reduced to one half of 50 kc., i.e., 25 kc. This output is mixed with the oscillation frequency of 80 mc. from the second local oscillator 69 in the second frequency converter 70 to provide a sum corresponding to the desired television sound signal of the degree of modulation of 25 kc. and having a carrier frequency of 95.75 mc.

Further as the frequency variation of the subcarrier wave oscillator 53 in the studio and that of the first local oscillator 67 in the broadcasting station are also reduced to one half simultaneously with the frequency shift, the frequency variation is also improved.

As can be clearly noted from the above description according to this invention steps of modulation and detection in the broadcasting station can be eliminated whereby modulators and the like of the sound broadcasting apparatus become unnecessary thus greatly simplifying the construction and arrangement of apparatus in the broadcasting station and decreasing the provability of faults. Moreover, as it is not required to effect frequency modulation in the broadcasting station supervision of the frequency characteristic of the sound broadcasting apparatus, distortion percentage, input level and the like becomes unnecessary, thus greatly simplifying maintenance. Where the system is operated as a nonattendant station, provision of an automatic sound monitoring device becomes unnecessary. Moreover, as has been pointed out hereinabove by utilizing a frequency demultiplier in a broadcasting station the degree of modulation of a frequency modulated wave of sound signals which is superposed upon video signals can be made sufficiently large whereby to greatly improve SN ratio as well as the percentage of frequency variation.

While certain particular examples of this invention have been disclosed for the purpose of illustration and description, it is to be understood that various changes can be made therein without departing from the spirit and scope of the invention, whereby it is intended to cover in the appended claims all such modification as fall within true spirit and scope of the invention.

What is claimed is:

1. A television sound broadcasting system including a studio and a broadcasting station, said studio comprising a subcarrier wave oscillator (53) and FM modulator (52) adapted to frequency shift output signals from said oscillator, by means of a source of sound signals, to an extent exceeding a prescribed maximum frequency shift of finally transmitted electric waves, a combiner (54) to combine the output signals from said modulator and video signals, a transmitter (56) modulated by the combined signal from said combiner, and means to transmit output signals from said transmitter to said broadcasting station; and said broadcasting station comprising a receiver (62) adapted to receive and demodulate the signals transmitted from said studio over an ST link, a separator (63) adapted to separate said combined signals demodulated by said receiver into said video signals and said frequency modulated subcarrier wave signals, a video transmitter (64) modulated by said video signals separated by said separator, a frequency divider (68) to step down the frequency of said subcarrier wave separated by said separator to an extent to provide the maximum frequency shift desired for the broadcasted electric wave, means to mix the output signals from said frequency divider with the output signals from said video transmitter and means (72) to radiate in the air said mixed signals as the television broadcasting electric wave.

2. The television sound broadcasting system according to claim 1 wherein said broadcasting station receiver receives signals which have been modulated by combined signals consisting of subcarrier wave signals frequency shifted by a source of sound signals to an extent exceeding a predetermined maximum frequency shift of the finally transmitted waves and video signals, said broadcasting station further including converter means (66) to mix the subcarrier wave separated by said separator with the output signal from a first local oscillator (67) to convert the frequency of said subcarrier wave, said frequency divider (68) serving to step down the frequency of said signals whose frequency has been converted by said converter means (66) to the required maximum frequency shift of broadcasted electric wave, second converter means (70) to mix the output signals from said frequency divider (68) with the output signals from a second local oscillator (69) to convert the frequency to the desired frequency for broadcasting electric waves, and means to mix said frequency converted signals with the output signals from said video transmitter.

3. The television sound broadcasting system according to claim 1 wherein said broadcasting station receiver receives signals which have been modulated by combined signals consisting of subcarrier wave signals frequency shifted by a source of sound signals to an extent exceeding a predetermined maximum frequency shift of the finally transmitted waves and video signals, said broadcasting station further including converter means (66) to mix the subcarrier wave separated by said separator with the output signals from a local oscillator (67) to convert the frequency of signals, a frequency divider (68) serving to step down the frequency of said signals whose frequency has been converted by said converter means (66) to the required maximum frequency shift of broadcasted electric waves, means to mix the output signals from said frequency divider with the output signals from said local oscillator to convert the frequency into the desired frequency for broadcasting electric waves, and means to mix said frequency converted signals with the output signals from said video transmitter.

References Cited

UNITED STATES PATENTS

| | | | |
|---|---|---|---|
| 2,104,011 | 1/1938 | Armstrong | 325—48 X |
| 2,284,415 | 5/1942 | Goldstine | 325—9 |
| 2,407,213 | 9/1946 | Tunick | 325—7 |
| 2,516,009 | 7/1950 | Mack et al. | 325—3 X |
| 2,531,199 | 11/1950 | Darling | 179—15 X |
| 2,949,605 | 8/1960 | Graziano et al. | 178—5.6 X |

ROBERT L. GRIFFIN, *Primary Examiner.*

BENEDICT V. SAFOUREK, *Assistant Examiner.*

U.S. Cl. X.R.

178—5.6; 325—11, 47; 343—200, 202